US011905653B2

(12) United States Patent
De Roeck

(10) Patent No.: US 11,905,653 B2
(45) Date of Patent: Feb. 20, 2024

(54) DECORATED NATURAL LEATHER

(71) Applicant: AGFA NV, Mortsel (BE)

(72) Inventor: Luc De Roeck, Mortsel (BE)

(73) Assignee: Agfa NV, Mortsel (BE)

( * ) Notice: Subject to any disclaimer, the term of this patent is extended or adjusted under 35 U.S.C. 154(b) by 280 days.

(21) Appl. No.: 17/609,099

(22) PCT Filed: Apr. 29, 2020

(86) PCT No.: PCT/EP2020/061835
§ 371 (c)(1),
(2) Date: Nov. 5, 2021

(87) PCT Pub. No.: WO2020/225046
PCT Pub. Date: Nov. 12, 2020

(65) Prior Publication Data
US 2022/0227147 A1    Jul. 21, 2022

(30) Foreign Application Priority Data

May 6, 2019    (EP) ..................... 19172742

(51) Int. Cl.
*D06P 3/32*    (2006.01)
*B41J 3/407*    (2006.01)
(Continued)

(52) U.S. Cl.
CPC ............... *D06P 3/32* (2013.01); *B41J 3/4078* (2013.01); *B41J 11/0085* (2013.01);
(Continued)

(58) Field of Classification Search
None
See application file for complete search history.

(56) References Cited

U.S. PATENT DOCUMENTS

| 2012/0064250 A1 | 3/2012 | Baccini et al. | |
| 2013/0239833 A1* | 9/2013 | Yiannakou | B41M 5/0076 |
| | | | 101/487 |

(Continued)

FOREIGN PATENT DOCUMENTS

| CN | 102947469 A | 2/2013 |
| CN | 102991145 A | 3/2013 |

(Continued)

OTHER PUBLICATIONS

European Patent Office, International Search Report in International Patent Application No. PCT/EP2020/061835, dated Jul. 15, 2020, 4 pp.

(Continued)

*Primary Examiner* — Katie L. Hammer
(74) *Attorney, Agent, or Firm* — Leydig, Voit & Mayer, Ltd.

(57) ABSTRACT

A method for decorating a natural leather comprising the following steps: a) holding by vacuum suction the natural leather with its corium side to an air-permeable support onto a vacuum support of an inkjet printer; and b) inkjet printing a decorative image on the natural leather wherein the air-permeable support is partly covered by said natural leather. The air-permeable support comprises a fibrous layer in contact with the corium side of the natural leather.

17 Claims, 2 Drawing Sheets

(51) Int. Cl.
  *B41J 11/00* (2006.01)
  *D06P 5/30* (2006.01)
  *B41M 5/00* (2006.01)
  *C09D 11/101* (2014.01)
  *C09D 11/322* (2014.01)
  *C14C 11/00* (2006.01)
  *B41M 7/00* (2006.01)
  *C14C 15/00* (2006.01)

(52) U.S. Cl.
  CPC ........ *B41M 5/0047* (2013.01); *B41M 5/0076* (2013.01); *C09D 11/101* (2013.01); *C09D 11/322* (2013.01); *C14C 11/003* (2013.01); *D06P 5/30* (2013.01); *B41M 7/0036* (2013.01); *C14C 15/00* (2013.01)

(56) References Cited

U.S. PATENT DOCUMENTS

2016/0067984 A1* 3/2016 Chung .................. B32B 5/02
  428/196
2018/0326757 A1* 11/2018 Bouwens ............... B65H 5/224

FOREIGN PATENT DOCUMENTS

| | | |
|---|---|---|
| CN | 103534361 A | 1/2014 |
| CN | 104334357 A | 2/2015 |
| CN | 109070604 A | 12/2018 |
| EP | 3450574 A1 | 3/2019 |
| KR | 2017-0143170 A1 | 12/2017 |
| WO | WO 2001/032434 A1 | 5/2001 |
| WO | WO 2012/120394 A1 | 9/2012 |
| WO | WO 2018/007121 A1 | 1/2018 |
| WO | WO 2018/114303 A1 | 6/2018 |
| WO | WO 2019/042952 A1 | 3/2019 |

OTHER PUBLICATIONS

European Patent Office, Written Opinion in International Patent Application No. PCT/EP2020/061835, dated Jul. 15, 2020, 6 pp.

* cited by examiner

DECORATED NATURAL LEATHER

CROSS-REFERENCE TO RELATED APPLICATIONS

This patent application is the U.S. national phase of copending International Patent Application No. PCT/EP2020/061835, filed Apr. 29, 2020, which claims the benefit of European Patent Application No. 19172742.9, filed May 6, 2019.

TECHNICAL FIELD

The present invention relates to the manufacturing of decorated natural leather and leather articles therewith.

BACKGROUND ART

The manufacturing of natural leather articles is well known and can generally be split up in five phases. The preparatory phase 1 often occurs partly in a slaughterhouse and partly in a tannery, while phases 2 to 4 occur in the tannery and phase 5 occurs at a leather article manufacturer. In a first phase, the preparatory phase, the skin is removed from the animal (flaying) and pre-treated for the second phase of tanning. The pre-treatment may involve processes such as soaking, liming, unhairing, splitting and pickling (adjusting pH for assisting penetration of tanning agents). In the tanning phase, the protein of the rawhide or skin is converted into a stable material that will not putrefy. Chrome is most frequently used as tanning agent wherein the tanned product obtains a pale blue colour, therefore commonly called "wet blue". In the third phase of crusting, the tanned leather is dried and softened. The crusting often includes processes such as stripping (removal of superficially fixed tannins), fat liquoring (fats, oils and waxes are fixed to the leather fibres), dyeing, whitening, physical softening, and buffing (abrasion of leather surface to reduce grain defects). In the fourth phase, called the finishing phase, the leather is made ready for sale to leather article manufacturers. Finishing operations may include lacquer coating, polishing and embossing. In the fifth phase, a leather article is manufactured, involving processes, which may include cutting, perforating, sewing, leather wrapping, decoration and embossing.

Natural leather has been decorated in the past by screen printing. However, screen printing is labour intensive as for each colour an individual screen is required. This is costly and time consuming, especially when personalization or customization is desired.

Digital printing technologies on finished leather have been investigated but many solutions on finished leather remain of inferior quality. Inkjet technologies from textile printing employing heat transfer paper have been explored for leather printing. However just like inkjet printing directly onto natural leather, it was found that a process of inkjet printing dye-based images onto a sheet of transfer paper and then transferring the images onto tanned leather by heat resulted in a quality unacceptable for many luxury leather products. Examples of such inkjet processes are disclosed in WO01/32434 A (GILHAM) and US 2016067984 A (CHUNG).

WO2019042952 (AGFA NV) discloses several methods of clamping natural leather on a rigid support for decorating said natural leather by an inkjet printing method. Another way of holding down natural leather is disclosed in KR20170143170 (CHAE MYUNG SUK) wherein a film is used to transport and support the natural leather in an inkjet printer.

WO2018114303 (AGFA NV) discloses at [0092] a leather inkjet printer wherein the leather is positioned on an air-permeable media support layer and held down by vacuum while printing.

The handling of natural leather on a support of an inkjet printer is not easy due to forces between intertwined fibres of said natural leather. Said forces cause wrinkles, even while printing, and said wrinkles result in regular collisions with the print heads of said printer. Enlarging the throw distance may overcome said collisions but this results in blurry inkjet printed decorative images. A vacuum support may help flattening the natural leather but said forces and the fibrous and tufted corium side, results in uncontrolled holding of said leather against the vacuum support, especially at the edges of said natural leather.

Using a sticky non-permeable support for adhering the natural leather and wherein said sticky non-permeable support is hold onto a vacuum support of a printer is a known method of supplying natural leather in an inkjet printer. But said stickiness makes it hard for (re)positioning said natural leather on said non-permeable support and the natural leather has a contamination of glue after removing the natural leather from said non-permeable support, which have to be cleaned in an extra step. Also the sticky layer from said non-permeable support have to be renewed or said non-permeable support is a consumable that may be reused only once or maximum two times, which results in manufacturing waste.

Hence, there is a need for obtaining a more efficient and faster method of high quality decorating natural leather wherein the method avoids collisions against expensive print heads.

SUMMARY OF INVENTION

In order to overcome the problems described above, preferred embodiments of the present invention have been realised with a method for decorating natural leather according to claim 1.

The present invention is a method for decorating a natural leather comprising the following steps:
  a) holding by vacuum suction the natural leather with its corium side to an air-permeable support onto a vacuum support of an inkjet printer; and
  b) inkjet printing an decorative image on the natural leather wherein the air-permeable support is partly covered by said natural leather. The natural leather has in the present invention a corium side and an opposite side whereon a decorative image shall be inkjet printed. Said opposite side is preferably a grain side. A support is air-permeable if the air-permeability is larger than 15 L/(dm²×min) at 200 Pa difference pressure.

The natural leather becomes by the present invention flat for printing and also edges of said natural leather becomes fixed to said air-permeable support whereby collisions against print heads of said inkjet printer are prevented. The air-permeable support becomes sandwiched by vacuum suction between the corium side and the vacuum support of the inkjet printer; wherein the natural leather partly covering said air-permeable support. The present invention is especially advantageous when said natural leather is irregular shaped or having an edge with a sharp corner.

To enhance the fixing of the edges and to control the holding down of the natural leather the air-permeable support comprises a fibrous layer in contact with the corium side of the natural leather or said air-permeable support is a fibrous layer in contact with the corium side. The corium side is fibrous and tufted whereby said fibrous layer of the air-permeable support grips and hooks up with said corium side.

The fibrous layer is preferably an unwoven fabric, more preferably felt and most preferably polyester felt. A polyester felt may be blended with other materials such as wool.

The fast holding and easy fixing of the natural leather by the present invention can be even more efficient wherein the air-permeable support comprises a register mark for arranging the natural leather or more than one natural leathers on said support and/or comprising an additional step prior to step b) applying register means on the air-permeable support for aligning the natural leather on said support.

Said register mark may be a ruler, a grid of n×m small squares or one or more small lines for easy registering said natural leather or even more than one natural leather. Said mark may comprise an identification code or means for calculating distances. Said register means is for example a registration pin or registration bar.

Due to forces between intertwined fibres of the natural leather it may happen that a hump or curl occur before printing; Said hump or curl have to be flattened before printing onto the vacuum support. This may be done by hand or more preferably by a flattening device, such as a squeegee or a flat iron.

Sometimes the natural leather is quite stiff; which may be softened by ironing or humidifying the natural leather before applying the natural leather on the air-permeable support. Another way of solving this is an additional step, prior to step a):

applying an adhesive on the corium side and/or the air-permeable support for making up a sticky layer between said corium side and said air-permeable support. Said other way is not preferred because glue remains on the corium side of the natural leather. Said remaining have to be washed off as extra step. Preferably the air-permeable support of the present invention does not have said sticky layer. Said sticky layer is preferably formed during step a) and b) for example by a heating step of the air-permeable support and/or natural leather if a heat-sensitive adhesive is used. The adhesive is in the present invention between the corium side and the air-permeable support when said corium side and said support are supplied together.

The present invention may be improved even more for high quality inkjet decorative images wherein the natural leather has also a grain side and wherein the grain side comprises a base coat and wherein the method comprises an additional step, after step b):

applying a top coat on the printed natural leather and heat pressing an assembly from said base coat, said natural leather, said printed decorative image, and said top coat. The decorative image is then printed on said base coat. In a preferred embodiment the air-permeable support may also be heat pressed together with previous assembly as support.

With the present invention also the distance of 'thrown' droplets from print head towards the natural leather for printing the decorative image can be shortened. Said throw distance is preferably lower than 4 mm and more preferably between 0.1 mm and 3 mm. Smaller the throw distance, better the image quality.

These and other objects of the present invention will become apparent from the detailed description hereinafter.

BRIEF DESCRIPTION OF DRAWINGS

FIG. 3 the air-permeable support (200) is a fibrous layer (250) in contact with said corium side.

DESCRIPTION OF EMBODIMENTS

Figure 1:
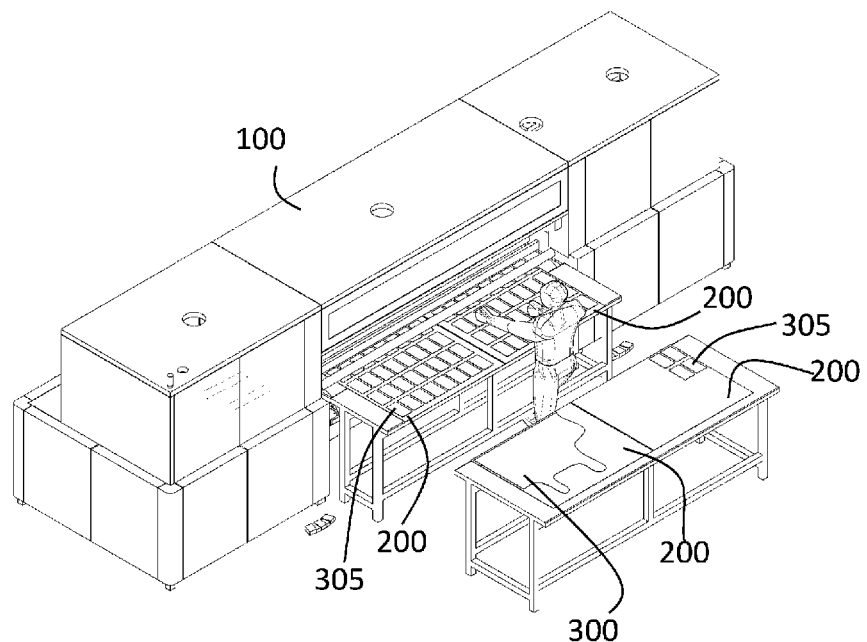
FIG. 1 illustrates the method of the present invention with a Jeti TAURO™ of AGFA NV as inkjet printer. Said printer is a wide-format inkjet printer and it comprises a vacuum belt (not visible). The operator prepares and supplies in FIG. 1 air-permeable supports (200) having leather panels (305) or a part of a hide (300) on said supports.
Figure 2:
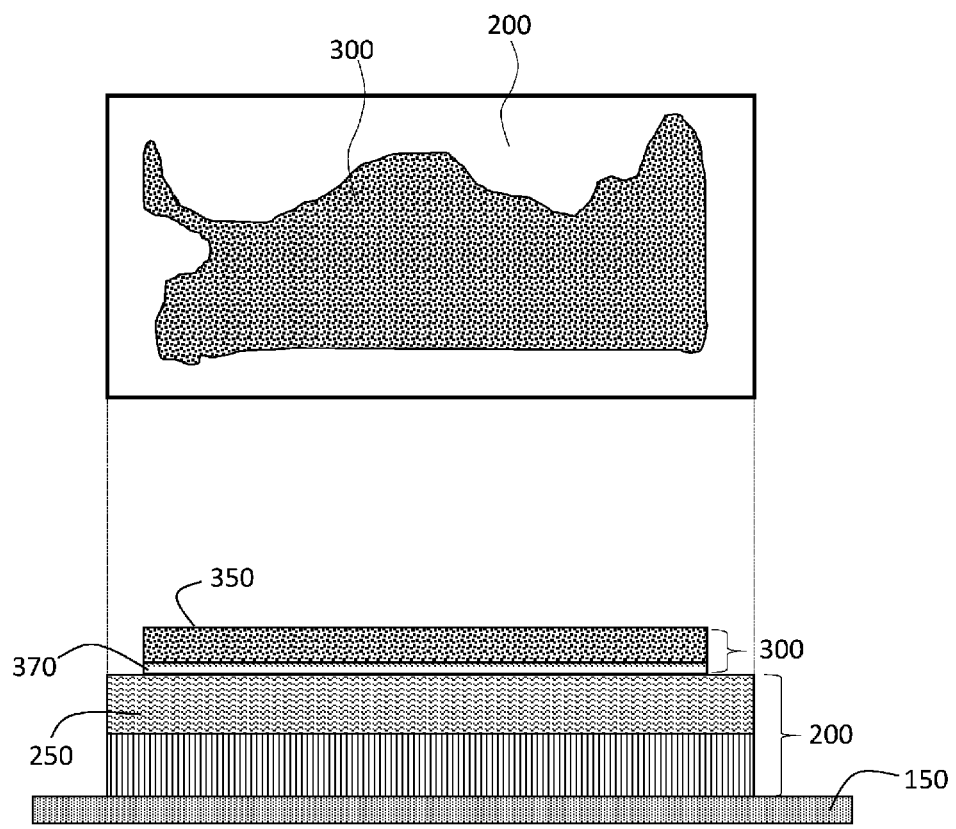
FIG. 2 and FIG. 3 illustrate a top view and cross-section of an air-permeable support (200) which supports a part of a hide (300). Said support is carried on a vacuum support (150) of an inkjet printer (not visible). The part of the hide has a corium side (370) and a grain side (350). The air-permeable support (200) in FIG. 2 comprises a fibrous layer (250) in contact with said corium side.
Figure 3:
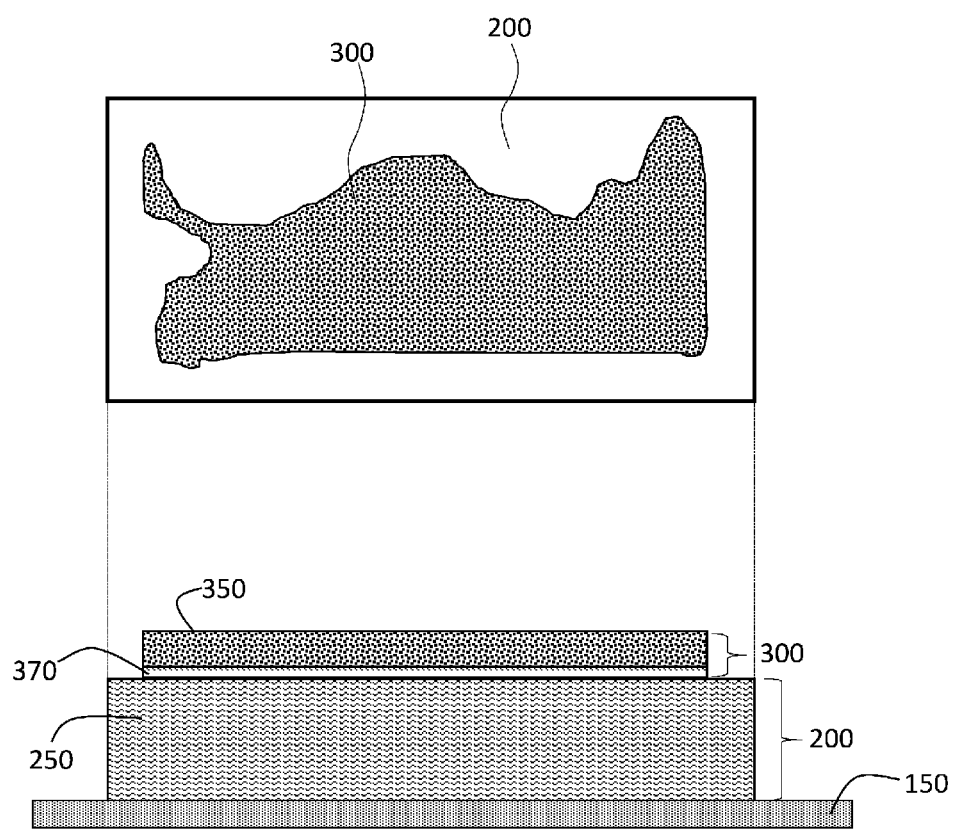

To avoid collisions of natural leather in an inkjet printer the present invention comprises a method for decorating a natural leather comprising the following steps:

a) holding by vacuum suction the natural leather with its corium side to an air-permeable support onto a vacuum support of an inkjet printer; and
  b) inkjet printing an decorative image on the natural leather wherein the air-permeable support is partly covered by said natural leather.

The air-permeable support may be reused for following print jobs on natural leather having a corium side. Also more than one natural leathers may be supplied on said air-permeable support for printing a decorative image on each of said natural leathers.

The natural leather may first be supplied on said air-permeable support and supplied onto the vacuum support if said air-permeable support is not a belt. Said order of steps is an advantage because the first step can be done in parallel, so called offline, while printing another natural leather onto another air-permeable support.

Or the air-permeable support may first be supplied onto the vacuum support and afterwards the natural leather may be supplied on said air-permeable support.

In the present invention the air-permeable support becomes sandwiched by vacuum suction between the natural leather and the vacuum support of the inkjet printer wherein said natural leather partly, thus not entirely, covers said air-permeable support for better adhering of the edges of said natural leather. On the assembly, formed by said natural leather and said air-permeable support, still part of the air-permeable support is visible.

It is found that if the air-permeable support is entirely covered by the natural leather, the edges of the natural leather are not held well against said air-permeable support.

Decorated Natural Leather and Leather Articles

Natural leather comes in different grades, such as full grain, top grain which is essentially full-grain but with part of the grain layer sanded and the underlying split layer removed, and split leather. For the latter, the underlying layer of the hide is removed and used to create split leather. Depending on the thickness of the underlying layer, many splits can be created. Split leather has a rough appearance and is usually used to make suede. The natural leather in the present invention has a corium side and preferably has a grain side and more preferably the natural leather is crusted leather.

For preventing grain damage and weakness, the hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects).

The decorated natural leather may be used for manufacturing a wide range of leather articles. Preferred leather articles include footwear, furniture, upholstery, bags and luggage, gloves, belts, wallets, clothing, automotive leather (e.g. train, plane, boat and car seats), interiors, books and stationary, packaging, equestrian articles and the like.

The present invention prevents especially edge curling of natural leather, which may touch a print head of the inkjet printer or misalign said print head. Said natural leather may be a hide or part of a hide but also panels, which are pieces of natural leather with a certain shape, achieved by cutting. Said pieces of natural leather are mainly used for manufacturing leather articles.

Adhesives

An adhesive is used for attaching a natural leather with its corium side to an air-permeable support. The adhesive may be applied to said air-permeable support, to said natural leather or to both of them.

Any adhesive known in the art can be used in the present invention, going from classical known adhesives to bio-mimic based adhesives. Repositionable adhesives are preferred, as they facilitate the process for ensuring that the leather is attached completely flat on the carrier causing no collision with the inkjet print heads. Heat sensitive glue is preferred because there is already light tackiness at room temperature and a high tackiness already from 30° C.

Bio-inspired reversible adhesives have been described by del Campo and Fernandez-Blázquez (Biomimetic Approaches for Biomaterial Development, chapter 11, ed. João F. Mano, Wiley-VCH Verlag GmbH& Co. KGaA, first edition, 2012).

Adhesives are known in different fields of technology such as textile printing, where water gluing and dry bonding approaches are used. Within dry bonding approaches, both permanent and thermoplastic adhesives are known in the art. Adhesives for textile printing are disclosed in Ullmans Encyclopädie der technischen Chemie, 4. Auflage, Band 23, 76-77 (VERLAG CHEMI, WEINHEIM).

In the present invention, pressure sensitive adhesives are a particular preferred type of adhesives. Removable pressure sensitive adhesives are known from applications such as the Post-It™ notes from 3 M.

Preferred polymers for pressure sensitive adhesives are selected from the group consisting of polyacrylates, silicone polymers, polydienes or copolymers thereof such as natural rubber and styrene-butadiene type of rubbers and block copolymers of styrene and a diene. Typical formulations of pressure sensitive adhesives further contain tackifying resins to tailor the properties towards the application. Pressure sensitive adhesives further can contain additives such as waxes, plasticizers and anti-oxidants.

The pressure sensitive adhesive is applied on a surface from water, a solvent or as a hot melt adhesive. Hot melt adhesives and water borne adhesives are preferred. Water borne adhesives are particularly preferred. Water borne pressure sensitive adhesives are emulsion-based and have been described in detail by Jovanović and Dubé (Journal of Macromolecular Science, Part C-Polymer Reviews, C44(1), 1-55 (2004)).

Suitable adhesives are available from KIWO (KISSEL+ WOLF GmbH).

There is no limitation on the way of applying the adhesive to a surface, which may be e.g. by coating or by spraying. Repositionable spray adhesives are preferred as they cause no or very limited damage to the corium side upon separating the carrier from the leather. A commercial example of a suitable spray adhesive is the 3M™ Repositionable 75 Spray Adhesive. Spray adhesives are also known as aerosol adhesives.

Use of an adhesive has also some disadvantages such as glue remaining on the corium side or air-permeable support, need of an extra pressure device . . . . But it is found when using heat sensitive glue, such as KIWOTEX TDK 35L from KIWO™, the contamination of glue on the corium side is very limited after step of inkjet printing. Thus preferably the air permeable support has no sticky layer as described above for a better adhering of the natural leather.

Air Permeable Supports

The air-permeable support is in the present invention larger than the natural leather and preferably flat. Said natural leather covers partly said support to have good adherence at the edges of said natural leather. When said support is even sized than said natural leather and said leather is fully covering said support, an edge of said natural leather can crimp (wavy or curl) due to the tufted corium side and its adherence while applying the vacuum. This may result in a collision against a print head of the inkjet printer.

The air-permeable support comprises one or more fibrous layers wherein the corium side of the natural leather preferably is contact with a fibrous layer from said one or more fibrous layers. Said fibrous layer attaches easily to said fibrous and tufted corium side. Said fibrous layer may be coated and/or is an unwoven fabric such as felt. Said felt may be wool felt but preferably it is a polyester felt. Also recycled polyester felt may be used. Polyester felt are most preferred because said felts have a tighter construction and they can be used in operating temperature above 30° C. Polyester felt may be blended with other materials such as wool.

To minimize the vacuum power for the air suction in the present invention the air-permeability of the air-permeable support may be at 200 Pa difference pressure between 30 and 120 L/(dm²×min) preferably between 35 and 90 L/(dm²× min). Said air-permeability can be measured with an AKUSTRON™ air permeability tester which follows industry standards DIN 53887, DIN 53120, ISO9237 and ASTM D 737-96. The air-permeability is thus measured in minutes, abbreviated as 'min'.

If the air-permeable support comprises a plurality of layers on top of each other, one or more of said layers is a fibrous layer but preferably all layers are fibrous. Said layers needs to be also air-permeable. The air-permeability of said air-permeable support is measured on all said multiple layers. Preferably a first layer from said plurality of layers in contact with the corium side is having a smaller air-permeability than a second layer, which is a subsequent layer of the first layer. Most preferably a subsequent layer of a layer of the plurality of layers has a higher air-permeability.

If the layer in contact with the corium side is an unwoven fabric, the orientation of the fibres of said unwoven fabric and said fibres which comes in contact with said corium side maybe adapted to have a better adherence with said fibrous and tufted corium side.

For easy handling and having a certain stiffness the air-permeable support the weight is preferably between 0.6 and 2.5 kg/m2. The thickness of said support is than preferably between 1.5 mm and 4 mm, more preferably between 1.5 mm and 3 mm. In a preferred embodiment is the thickness of the air-permeable support twice or more than the thickness of the supported natural leather but more preferably the thickness of the air-permeable support is not more than 100 times the thickness of the supported natural leather.

The result of the method obtained in the present invention after inkjet printing is an assembly of a decorated natural leather wherein its corium side is attached to an air-permeable support or a preferred air-permeable support as disclosed above. The attachment is preferably caused by vacuum suction through said air-permeably support. Said assembly is an embodiment of the present invention.

The inkjet printed decorative image may be composed of nested sub-images to be cut out as leather pieces. The cutting may occur after removal of decorated natural leather from the air-permeable support, but is preferably performed when the decorated natural leather is still attached to said support. The support comprises then preferably a polyester felt as layer in contact with the corium side of the natural leather. Another advantage of the assembly is that it facilitates transport between the tannery and the leather article manufacturer as the assemblies can be easily stapled onto pallets. An identifier, preferably a machine-readable identification code, on the assembly may be used to identify the leather article manufacturer, thus aiding in the logistic process.

Also heat pressing of the decorated natural leather may be performed when said leather is still attached with said corium side to the air-permeable support. Hereby is the natural leather preferably a crusted leather which is more preferably base coated prior printing a decorated image and which is most preferably top coated after printing said image. Said base coat, natural leather, decorative image and top coat may than be sandwiched together by said heat pressing step. A skin texture relief may additional be applied on said top coat while or after the heat pressing step.

In a preferred embodiment is the air-permeable support a conveyor belt, wrapped around the vacuum support and plurality of pulleys or gliders. Said conveyor belt may be driven by an electric motor for producing a torque to one of said pulleys or conveyed when connected to a vacuum belt as vacuum support. Said last embodiment is highly preferred because the vacuum belt as vacuum support is arranged for printing correctly such as in register and with controlled speed. If the vacuum support is a vacuum table, the air-permeable support has to be stiff and have a low stretchability for printing in register and with controlled speed.

The conveying is preferably with successive distance movements, also called discrete step increments.

The air-permeable support may also be a sheet having one or more fibrous layers and wherein said support has an area larger than the natural leather.

After the printing-step in the present invention the air-permeable support may be cleaned. This may be performed by a support cleaner comprising:
- a receptacle for a cleaning-liquid; and
- a cleaning-roll, which is in contact with said air-permeable support;

wherein the cleaning-roll comprises an elongated carpet fabric which is helical enfold around the cleaning-roll and in which the pile is composed of yarn tufts in loop and/or cut configuration; and wherein the cleaning-roll comprises a helical channel along the length of the enfolded carpet fabric for draining the cleaning-liquid from the cleaning-roll and/or for wetting the cleaning-roll by the cleaning-liquid. If the air-permeable belt is a conveyor belt, said cleaning step may be performed while conveying.

The support side of the air-permeable support, which is in the present invention the side in contact with the corium side may be impregnated and/or coated with PUR and/or glue. Also the other side, which shall be in contact with the vacuum support may also be impregnated for better sliding for example impregnation with PUR. Coating or impregnating the fibrous layer in contact with the corium side is less preferred because then the fibres on top of said layer hooks less with said corium side.

When one or more natural leathers are supplied on the air-permeable support, the position may be scanned by a camera-system above said air-permeable support. If said support has a registration mark or registration means or an identification code said scanning can be used for optimizing the supply chain of the decorated natural leathers of the present invention. In post-processing of the decorated natural leather said identification code and positions of said one or more natural leathers can be used for example in cutting or heat-pressing or embossing or top-coating said natural leathers if they are still on said air-permeable support.

When the one or more natural leathers are scanned by the camera-system, the edges, forming a contour, may be detected and provided to the inkjet-printer or the image-converter, such as a raster image processor, to prevent that ink is spoiled over the edges of the one or more natural leathers and on the air-permeable support when an image, such as decorative pattern, is printed on the one or more natural leathers. An image is mostly stored in memory as a rectangular array of pixels. The contour of the held natural leather is not always rectangular and mostly irregular shaped. The prevention may easily be performed by masking parts of an image based on the detected edges of the one or more natural leathers. The scanner may even detect bites or bad parts in the one or more natural leathers so also no ink is spoiled on said parts or bites. The position of the one or more natural leathers, known by the scanning and detection can also be used in nesting images over the one or more natural leathers such as in the application from Elitron™: EliNest.

The camera-system may be a digital 2D-camera or 3D-camera or line-camera positioned above the air-permeable support. The camera-system may have means for transporting said camera's in the 3 dimensions (height, width and length) towards the natural leather or away from the natural leather. The camera-system may also have one or more lenses for capturing scaled images from the natural leather which is held on said air-permeable support.

If said air-permeable support has a non-woven fabric as fibrous layer according a preferred embodiment and the post-processing is cutting in the natural leather wherein it is still on said air-permeable support, the damage of said support by said cutting is minimal. Said non-woven fabric is then preferably polyester felt. Hereby is the air-permeable support reusable for the following print job for decorating natural leather according the present invention.

The cutting may also be performed before printing. Unneeded pieces of the cut natural leather or cut decorated natural leather maybe removed manually or by a robot arm from the air-permeable support. Also needed pieces for manufacturing a leather article or a supplied natural leather on said air-permeable support may be removed by a robot arm from said air-permeable support towards a storage place such as a basket. The robot arm probably has a clamp for clamping the natural leather or a needed or an unneeded piece. Another robot arm or same robot arm may be used for supplying natural leather on the air-permeable support before the printing step.

In a preferred embodiment the natural leather comprises a mating hole which matches a head portion of a registration pin supplied to the air-permeable support. Said registration pin is preferably manufactured from a stainless steel, aluminium or plastic material. The mating hole in the natural leather may be added to the leather, preferably near an edge of said natural leather, by punching said natural leather for example with a perforator. The edge of a natural leather is mostly lower in quality, especially when said natural leather is a half hide or whole hide. The mating hole may also be used in post processing the inkjet printed leather for registration such as cutting in panels.

To avoid collisions with the print heads of the inkjet printer, a head portion of a register means, such as said registration pin, extends above the natural leather to a height smaller than the throw distance of said print heads, preferably to a height between 0.1 mm and 3 mm. A bottom portion of said register means may have means for supplying the registration pin into the air-permeable support for example by screwing or drilling or piercing. If said supply of a registration pin is done in the fibrous layer from the previous embodiments, such as unwoven fabric, said pin can easily be removed without leaving a significant hole. Said air-permeable support may be reused several times wherein said pin is (re)positioned more than once.

By pressing the natural leather and the air-permeable support while flattening and feeding said natural leather and air-permeable support through a slit, the corium side with its tufted and fibrous characteristics hooks up eve, better with the fibrous layer of the air-permeable support. A plurality of small fibres of said fibrous layer in contact with the corium side are preferably oriented in opposite direction of said feeding direction.

Vacuum Support

The vacuum support is preferably a vacuum table, more preferably a vacuum belt wrapped around a vacuum table together with a plurality of pulleys for conveying said vacuum belt and for transporting pieces supported on said vacuum belt.

In the present invention the natural leather is hold onto the vacuum support by vacuum suction. Said vacuum suction is provided through said vacuum support by a connected vacuum chamber via a plurality of apertures and air channels. The working of a vacuum support, such as vacuum table or vacuum belt are well-known. An example of such vacuum support is disclosed in WO2016/071122 A1 (AGFA GRAPHICS NV).

The vacuum belt preferably comprises a set of air-channels connecting top-surface and bottom-surface of the vacuum belt; and
  the set of air-channels couples the air-permeable support
    to the vacuum belt by vacuum suction in the set of
    air-channels; and
wherein the vacuum belt is characterized by having a plurality of dimples at the top-surface wherein each dimple comprises a closed bottom end; and
wherein the dimple is connected with an air-channel of the set of air-channels to form an air cup and to couple the air-permeable support to the vacuum belt at the dimple by vacuum suction. Said preferred vacuum belt is disclosed in WO 2017/036943 A1 (AGFA GRAPHICS NV).

Another preferred vacuum belt in combination with a vacuum table is disclosed in WO 2018/007121 A1 (AGFA GRAPHICS NV).

In a preferred embodiment wherein the vacuum support is a vacuum belt the air-permeable support is another belt wrapped around said vacuum belt and a plurality of gliders or pulleys. Said specific air-permeable support is conveyed by adhering with air suction to the vacuum belt, while conveying the vacuum belt.

The present invention is tested and validated with the following inkjet printers Jeti Mira and Jeti Tauro H2500, manufactured by Agfa NV and panels and parts of crusted calfskin leather from NUTI IVO. Several types of air-permeable support are tested and validated such as NOVO 25-HC Black and NOVO 40-HC Black from Forbo™.

Decorative Images

There is no real limitation on the type of decorative image inkjet printed on the natural leather using one or more pigmented inkjet inks. The decorative image may consist of a single colour or it may include multiple colours such as black, white, cyan, magenta, yellow, red, orange, violet, blue, green and brown.

The decorative image may be printed as an uninterrupted image, where individual leather pieces are cut out or alternatively the decorative image may consist of sub-images, for example representing the different leather pieces required to assemble a leather article. In the latter case, the sub-images are preferably nested into a decorative image containing sub-images. By nesting sub-images, the waste of unused leather having a printable area can be minimized, which represents a clear economic benefit.

The decorative image may also include cutting lines for facilitating the cutting of leather pieces. Cutting may be performed manually using these cutting lines, but is preferably done by using some kind of automation for the cutting of leather, such as e.g. implemented in the Versalis™ cutting machines from LECTRA.

Base Coats

The base coat applied on the natural leather, preferably crust leather, provides a level of image quality commensurate to the luxury aspect of leather as the low viscosity of inkjet inks lets them penetrate rapidly into the leather resulting in a reduced image quality.

The base coat may be applied as a single layer, or may be applied as multiple layers. The multiple layers may even have a different composition for improving properties like adhesion or flexibility.

The base coat preferably includes a polymer or copolymer based on polyurethane, as this has been found to improve flexibility to the printed leather. The base coat preferably further includes a polyamide polymer or copolymer, as polyamide has been found to improve the compatibility with the crust leather and to improve the strength of the base coat.

In a preferred embodiment, the base coat preferably includes a polymer or copolymer based on polyurethane and polymer or copolymer based on a polyacrylate. Such a combination brings excellent flexibility even in the presence of pigments.

A cross-linker may be incorporated in the base coat to improve the strength of the base coat and the adhesion to natural leather.

The base coat is preferably applied by spraying, but may be applied by any coating technique known, such as knife coating, extrusion coating, slide hopper coating and curtain coating. It can be applied prior to attaching the natural leather to air-permeable support or it may be applied when the natural leather is already attached to the air-permeable support.

The base coat may be a white base coat to enhance the colour vibrancy of the inkjet printed decorative image, but preferably the base coat has a colour similar to that of the corium side or the grain side.

Pigmented Inkjet Inks

The one or more pigmented inkjet inks that are inkjet printed may be selected from aqueous pigmented inkjet inks, solvent based pigmented inkjet inks and radiation curable pigmented inkjet inks. However, the one or more pigmented inkjet inks are preferably one or more radiation curable inkjet ink, most preferably one or more UV curable inkjet inks.

The one or more pigmented inkjet inks preferably contain organic colour pigments as they allow for obtaining a high colour gamut on natural leather. Carbon black and titanium dioxide are inorganic pigments, which can be advantageously used in the present invention for composing black respectively white pigmented inkjet inks.

In a preferred embodiment, the one or more pigmented inkjet inks form a CMYK(W) or CRYK(W) inkjet ink set.

Pigment particles in inkjet inks should be sufficiently small to permit free flow of the ink through the inkjet-printing device, especially at the ejecting nozzles. It is also desirable to use small particles for maximum colour strength and to slow down sedimentation. The numeric average pigment particle size of an organic colour pigment and an inorganic black pigment is preferably between 0.050 and 1 µm, more preferably between 0.070 and 0.300 µm and most preferably between 0.080 and 0.200 µm.

When using UV curable pigmented inkjet inks, polymerizable compounds and at least one photoinitiator is present in the inkjet ink. The UV curable inkjet ink contains one or more photoinitiators, preferably one or more free radical photoinitiators. A free radical photoinitiator is a chemical compound that initiates polymerization of monomers and oligomers when exposed to actinic radiation by the formation of a free radical. The preparation of pigmented UV curable inkjet inks is well-known to the skilled person. Preferred methods of preparation are disclosed in paragraphs [0076] to of WO2011/069943 (AGFA).

In a preferred embodiment the image is dried after or while printing the image on the natural leather, said image is dried by a radiating device. The radiation is preferably performed by using a UV bulb lamp or a plurality of UV light emitting diodes but this generates heat which enhances the chance of curling of natural leather if supplied directly on the vacuum support. When using the present invention said curling of the natural leather is solved.

The inkjet printer is a digital printer wherein a non-contact printing technology is used. For having a good image quality, a constant height between a print head and ink-receiver is needed. In the present invention said inkjet printer may be a multi pass inkjet printer but a single pass inkjet printer is preferred.

Top Coats

A top coat may be applied onto the decorative image and the base coat for enhancing the scratch resistance of the decorative image.

The top coat may be applied as a single layer, or may be applied as multiple layers. The multiple layers may even have a different composition for improving properties like scratch resistance.

The protective top coat may have the same or a similar composition as the base coat. Usually the protective top coat is somewhat optimized according to the leather application. For example, flexibility does not play an important role for a leather book cover contrary to leather shoes. Hence, the protective top coat for a book cover may be optimized towards scratch resistance.

The top coat preferably includes a cross-linker and a polymer or copolymer based on polyurethane and/or polyamide.

The top coat preferably includes a polymer or copolymer based on polyurethane as this is beneficial for the flexibility of the printed leather. A polyamide polymer, which is found to have a high compatibility with a polyurethane binder, is preferably included if the scratch resistance needs to be improved.

In a preferred embodiment, the top coat preferably includes a polymer or copolymer based on polyurethane and polymer or copolymer based on a polyacrylate. Such a combination brings excellent flexibility.

A cross-linker may be incorporated in the protective top coat to improve the scratch resistance. Preferred cross-linkers include those mentioned above for the base coat.

The top coat is preferably applied by spraying, but may be applied by the same coating techniques as mentioned above for the base coat.

The top coat is most preferably a transparent top coat, but may be a translucent top coat. By having a transparent top coat, the inkjet printed image is clearly visible through the top coat. By using a translucent top coat, a special aesthetic effect is created.

If a matt top surface is desired for the inkjet printed leather, a matting agent may be included. Any suitable matting agent may be used.

The invention claimed is:

1. A method for decorating a natural leather which comprises a corium side, the method comprising the following steps:
    a) holding by vacuum suction the natural leather with its corium side to an air-permeable support which is carried on a vacuum support of an inkjet printer; and
    b) inkjet printing a decorative image on the natural leather wherein the air-permeable support is partly covered by said natural leather, and
    wherein the air-permeable support comprises a fibrous layer in contact with the corium side of the natural leather.

2. The method according to claim 1, wherein the fibrous layer is an unwoven fabric.

3. The method according to claim 2, wherein the unwoven fabric is a felt.

4. The method according to claim 3, wherein the felt is a polyester felt.

5. The method according to claim 1, wherein the fibrous layer is in contact with the vacuum support.

6. The method according to claim 1, wherein the fibrous layer has an air permeability below 90 L/(dm$^2$×min).

7. The method according to claim 1, wherein the air-permeable support comprises a register mark for arranging the natural leather on said support.

8. The method according to claim 1, the method further comprising an additional step prior to step b), wherein the additional step prior to step b) includes:
    applying register means for aligning the natural leather on the air-permeable support.

9. The method according to claim 1, the method further comprising an additional step prior to step b), wherein the additional step prior to step b) includes:
    flattening said leather onto the air-permeable support.

10. The method according to claim 9, the method further comprising an additional step prior to step a), wherein the additional step prior to step a) includes:

applying an adhesive on the corium side and/or the air-permeable support suitable for making up a sticky layer between the corium side and the air-permeable support during.

11. The method according to claim 1, wherein the air-permeable support is a conveyor belt, wrapped around the vacuum support and more than one pulley.

12. The method according to claim 1, the method further comprising an additional step after step b), wherein the additional step after step b) includes:

washing the air-permeable support for cleaning said support.

13. The method according to claim 1, wherein the natural leather has a grain side, provided with a base coat and wherein the decorative image is printed on said base coat.

14. The method according to claim 13, the method further comprising an additional step after step b), wherein the additional step after step b) includes:

applying a top coat on the printed decorative image and heat pressing the printed decorative image and said top coat.

15. The method according to claim 1, the method further comprising:

a scanning step by a camera-system between step a) and step b) for determining a contour of the held natural leather from a captured image of said leather; and optionally for determining a position of the held natural leather on the air-permeable support from said captured image; and a step before printing wherein the decorative image is masked outside said determined contour for preventing spoiling ink outside the determined contour on the air-permeable support.

16. The method according to claim 3, wherein the natural leather has a grain side, provided with a base coat and wherein the decorative image is printed on said base coat.

17. The method according to claim 16, the method further comprising an additional step after step b), wherein the additional step after step b) includes:

applying a top coat on the printed decorative image and heat pressing the printed decorative image and said top coat.

* * * * *